Patented Nov. 17, 1931

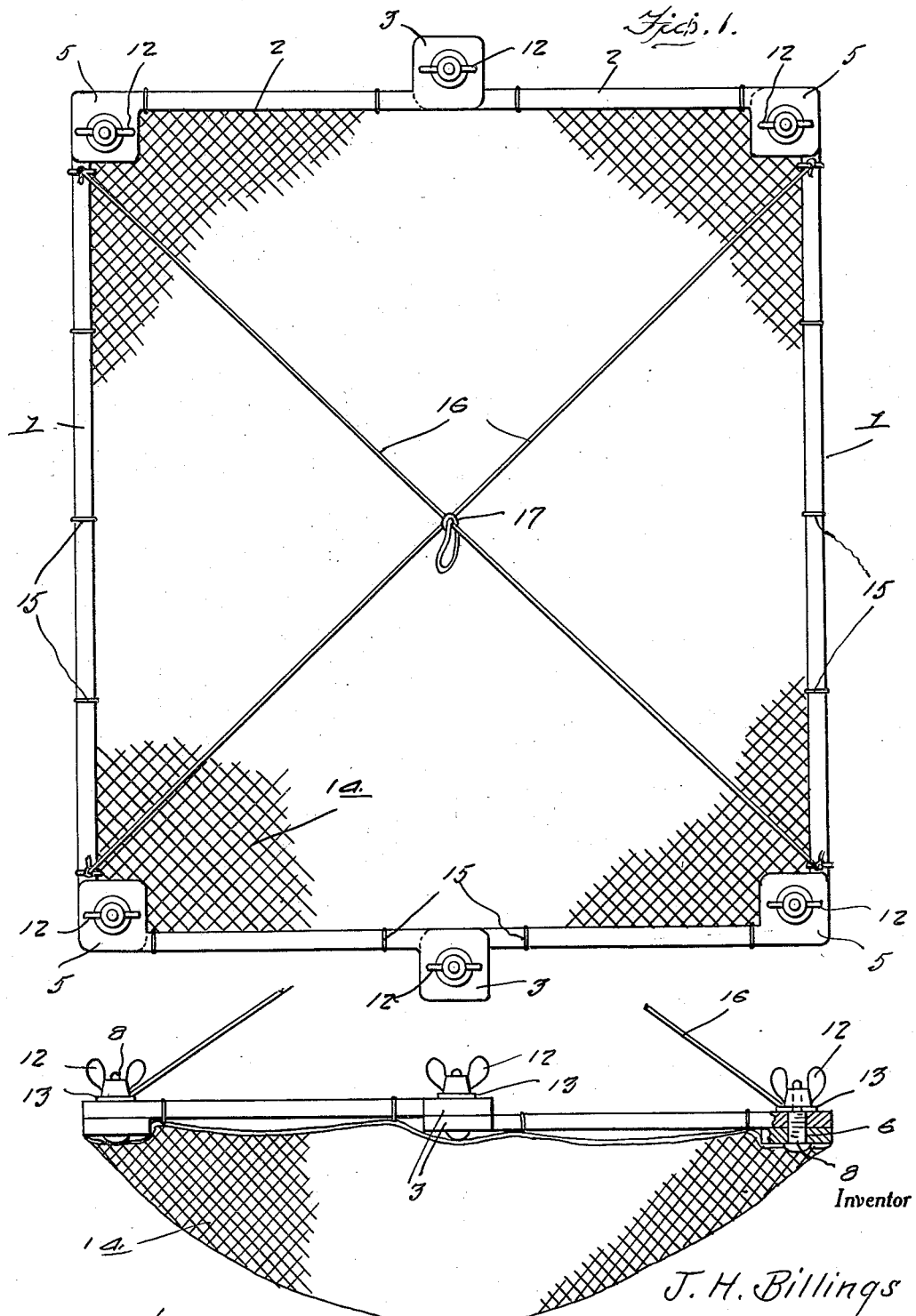

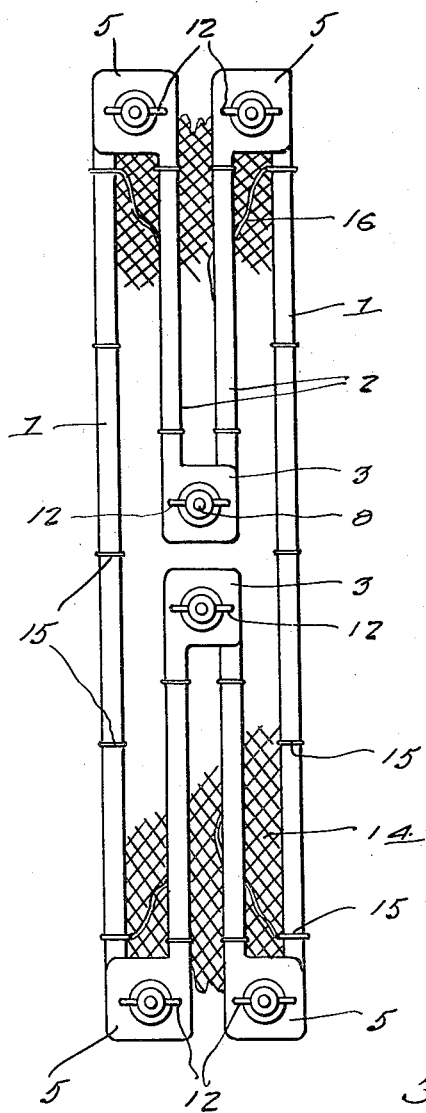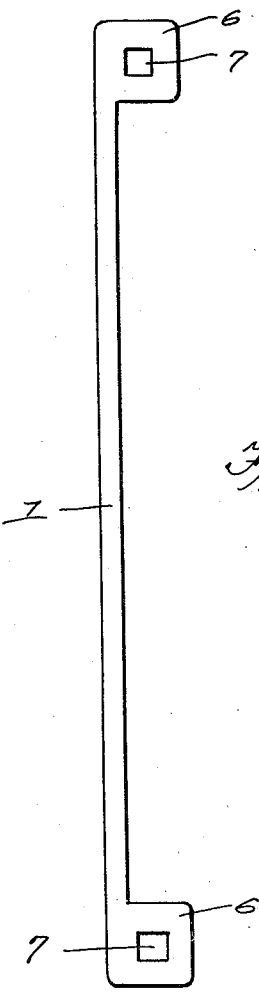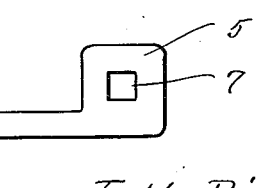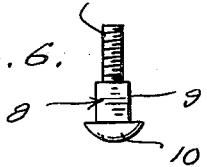

1,832,178

UNITED STATES PATENT OFFICE

JOHN H. BILLINGS, OF NEENAH, WISCONSIN

MINNOW DIP NET

Application filed May 23, 1931. Serial No. 539,583.

This invention relates to a minnow dip net and has for its primary object to provide, in a manner as hereinafter set forth, a device of this character embodying a novel construction and arrangement of parts whereby said net may be stored in a comparatively small space and whereby the net may be conveniently carried from place to place when desired.

Other objects of the invention are to provide a minnow dip net of the character described which will be simple in construction, strong, durable, efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in top plan showing a minnow dip net in accordance with this invention in extended position and ready for use.

Figure 2 is a view in end elevation of the net in extended position, showing a corner portion thereof broken away in section.

Figure 3 is a view in top plan of the net in unextended position for convenient carrying or storing in a small space.

Figure 4 is a detail view in plan of one of the end bars of the net frame.

Figure 5 is a detail view in plan of one of the end bar sections.

Figure 6 is a detail view in elevation of one of the frame section connecting bolts.

Referring now to the drawings in detail, it will be seen that the net comprises a substantially rectangular frame which includes the side bars 1 and a pair of end bars, each end bar comprising the sections 2. The sections 2 comprising the end bars of the frame have formed integrally on their inner ends the outturned square heads 3 having the aligned square openings 4 therein. One of the heads 3 of each pair of the sections 2 is, of course, disposed over the head 3 of the other section 2 of each pair of said sections.

The sections 2 have formed integrally with their outer ends the inturned square heads 5 which overlie the square heads 6 which are inturned on the ends of the side bars 1 of the frame. The heads 5 and 6 are provided with aligned square openings 7.

The sections 2 are adapted to be detachably connected with each other and with the side bars 1 through the medium of the bolts 8 having portions 9 of square cross section for insertion in the square openings 4 and 7 of the heads 3, 5 and 6. The bolts 8 further include rounded heads 10 on one end of the square portions 9 and the threaded shanks 11 on the other ends of the square portions 9. Winged nuts 12 are threaded on the shanks 11 for securing the bolts 8 in position, washers 13 being interposed between the winged nuts and the frame members.

The reference numeral 14 designates a net of suitable mesh which is connected to the frame members by suitable rings or loops 15. Crossed cords or ropes 16 extend diagonally across the frame and have their ends anchored to the corner portions of said frame. Where the cords or ropes intersect, said cords or ropes are tied or connected together, as at 17. The cords or ropes 16 constitute a bale or handle for facilitating the use of the net.

When the net is assembled for use, the frame elements are secured in the position shown in Figures 1 and 2 of the drawings, the square portions 9 of the bolts 8 preventing swinging movement of the frame elements relative to each, said square portions, as before stated, being disposed in the square openings in the heads of the frame elements. When the net is not in use and it is desired to carry or store the same, the bolts 8 are withdrawn and the sections 2 are disposed in parallelism with each other and in parallelism with the side bars 1 as clearly seen in Figure 3 of the drawings, after which the bolts 8 are reinserted and secured by the winged nuts 12 and the washers 13. It will thus be seen that the net is rigidly secured in its extended or unextended positions.

It is believed that the many advantages of a minnow dip net constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A minnow dip net comprising a substantially rectangular frame including a pair of side bars, inwardly turned heads formed integrally with the ends of the side bars, the frame further including a pair of end bars, each of the end bars comprising a pair of sections, outturned heads formed integrally on one end of the sections and disposed in overlapping relation to each other, inturned heads formed integrally with the other ends of the sections and disposed in overlapping relation to the side bar heads, the overlapping heads having polygonal, registering openings therein, bolts removably insertable in the polygonal openings, said bolts having heads on one end and further including portions of polygonal cross section for disposition in the polygonal openings for retaining the side bars and the sections against the swinging motion relative to each other, the bolts still further including threaded shank portions, retaining nuts threaded on the shank portions, a net secured to the frame on one side thereof, and a flexible bail secured to the frame on the other side of said frame.

2. A minnow dip net comprising a frame including a pair of side bars and sectional end bars, means for rigidly and detachably connecting the sections of the end bars together selectively in alignment or in parallelism, and means for rigidly and detachably connecting the sections of the end bars to the side bars selectively at substantially right angles thereto or substantially in parallelism therewith.

In testimony whereof I affix my signature.

JOHN H. BILLINGS.